United States Patent
Bandholz et al.

(10) Patent No.: US 8,249,501 B2
(45) Date of Patent: Aug. 21, 2012

(54) SELF-DETECTING ELECTRONIC CONNECTION FOR ELECTRONIC DEVICES

(75) Inventors: Justin Potok Bandholz, Cary, NC (US); Thomas Dixon Pahel, Jr., Raleigh, NC (US); Pravin Patel, Cary, NC (US); Philip Louis Weinstein, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 1143 days.

(21) Appl. No.: 12/114,934

(22) Filed: May 5, 2008

(65) Prior Publication Data

US 2009/0273911 A1 Nov. 5, 2009

(51) Int. Cl.
*H04B 5/00* (2006.01)

(52) U.S. Cl. .......................................... 455/41.1; 326/30

(58) Field of Classification Search ................ 326/30; 455/41.1
See application file for complete search history.

(56) References Cited

U.S. PATENT DOCUMENTS

| | | | |
|---|---|---|---|
| 4,697,099 A | 9/1987 | Bonaccio | |
| 5,068,642 A | 11/1991 | Hruby et al. | |
| 5,282,237 A | 1/1994 | Babu et al. | |
| 6,781,366 B2 | 8/2004 | Hiramatsu et al. | |
| 6,856,169 B2 * | 2/2005 | Frans et al. | 326/82 |
| 6,871,252 B1 * | 3/2005 | Cline | 710/313 |
| 6,960,919 B2 | 11/2005 | Barmettler | |
| 7,197,693 B2 | 3/2007 | Hashizume | |
| 7,259,482 B2 | 8/2007 | Voll et al. | |
| 2005/0132240 A1 | 6/2005 | Stineman, Jr. et al. | |
| 2007/0242384 A1 | 10/2007 | Contreras et al. | |
| 2010/0329390 A1 * | 12/2010 | Chow et al. | 375/319 |

FOREIGN PATENT DOCUMENTS

WO  WO 2007129012  11/2007

* cited by examiner

*Primary Examiner* — John Poos
(74) *Attorney, Agent, or Firm* — Cynthia G. Seal; Jeffrey L. Streets

(57) ABSTRACT

According to one embodiment, an apparatus has first and second connectors configured for removably connecting to one another. The first connector circuit has a first differential amplifier, a first differential signal path, a first capacitor section capacitively coupling the first differential amplifier to the first differential signal path, and a first DC biasing circuit for imparting a first DC bias to the first differential signal path opposite the first capacitor section. The second connector circuit has a second differential amplifier, a second differential signal path, a second capacitor section capacitively coupling the second differential amplifier to the second differential signal path, and a second DC biasing circuit for imparting a second DC bias to the second differential signal path opposite the second capacitor section having a different magnitude than the first DC bias when the first and second connector are not connected. One or both of the first and second connector circuits is configured for detecting a change in the first or second DC bias and outputting a connection status signal in response to the detected change.

16 Claims, 6 Drawing Sheets

SELF-DETECTING ELECTRONIC CONNECTION FOR ELECTRONIC DEVICES

BACKGROUND OF THE INVENTION

1. Field of the Invention

The present invention relates to electronic connectors for electronic devices.

2. Description of the Related Art

An electrical connector is an interface that allows an electronic device to be removably connected to another electronic device or system, to provide electronic communication between the connected devices. For example, hardware components such as hard drives, optical drives, and expansion cards commonly include electrical connectors for interfacing with a computer system. A common configuration is for a male connector on one device to mate directly with a female connector on another device. A cable may also be used to couple the connector of one device with the connector on another device over some distance. A connector typically includes a plurality of electrical terminals that are electrically connected to corresponding terminals of another connector, to provide electrical signal paths between the connected devices. For example, the electronic terminals may take the form of pins housed in a connector body or conductive traces formed on a circuit board. These signal paths may be used to communicate data and/or power.

Various methods and devices are also known in the art for detecting when two connectors are coupled or not coupled. For example, spare or reserved pins may be used for detecting whether a connection has been made. However, some connections already utilize all of the pins for data or power, such that the connection can not be detected in this manner.

SUMMARY OF THE INVENTION

A first embodiment provides an apparatus having first and second connectors configured for removably connecting to one another. The first connector circuit has a first differential amplifier, a first differential signal path, a first capacitor section capacitively coupling the first differential amplifier to the first differential signal path, and a first DC biasing circuit for imparting a first DC bias to the first differential signal path opposite the first capacitor section. The second connector circuit has a second differential amplifier, a second differential signal path, a second capacitor section capacitively coupling the second differential amplifier to the second differential signal path, and a second DC biasing circuit for imparting a second DC bias to the second differential signal path opposite the second capacitor section having a different magnitude than the first DC bias when the first and second connector are not connected. One or both of the first and second connector circuits is configured for detecting a change in the first or second DC bias and outputting a connection status signal in response to the detected change.

A second embodiment provides a system, in which a first electronic device is configured for generating a single-ended data signal and has a first connector with a first connector circuit configured for generating a differential signal representative of the single-ended data signal. A second electronic device has a second connector configured for connecting to the first connector. The second connector includes a second connector circuit configured for receiving and interpreting the differential signal. A DC biasing circuit imparts a first DC bias to the first connector circuit and a second DC bias to the second connector circuit. The first and second DC biases have different magnitudes when the first and second connectors are not connected. The DC biasing circuit detects a change in the first or second DC biases and outputs a connection status signal in response thereto.

A third embodiment provides a method. A first DC bias is generated at a first electronic device and a second DC bias is generated at a second electronic device. The second DC bias has a different magnitude than the first DC bias when the first and second devices are not connected. A change in magnitude of the first or second DC bias is detected in response to connection of the first and second electronic devices. A connection status signal is generated indicating whether the first and second electronic devices are connected according to the magnitude of the first or second DC bias.

Other embodiments of the invention will be provided in the following description and the appended claims.

DETAILED DESCRIPTION OF THE INVENTION

Embodiments of the present invention include a method, apparatus, and system for automatically detecting an electronic connection of two electronic devices. In one embodiment, a connection is selectively established by connecting a connector of one electronic device with the connector of another device, such as by physically mating the two connectors or by coupling the connectors with a data cable. A DC bias is imparted to each connector, such that the two connectors have unequal DC bias when not connected. When the two devices are connected, the DC bias value at each connector will change to an intermediate DC bias value. When the two devices are subsequently disconnected, the DC biases at the connectors will change back to their original values. The magnitude or change in magnitude of the DC bias at either or both connector is detected as an indication of whether the two connectors are presently connected or disconnected. The connection or disconnection may be verified by comparing the measured DC bias values to expected values. The expected values may be calculated or empirically determined. A connection status signal is generated, indicating whether the DC bias values are consistent with the connectors being connected or disconnected. A visual indication of whether the first and second electronic devices are connected or disconnected may be generated in response to the connection status signal. For example, an LED or lamp may be illuminated on the device, or the connection status may be displayed on a display console.

Figure 1A:
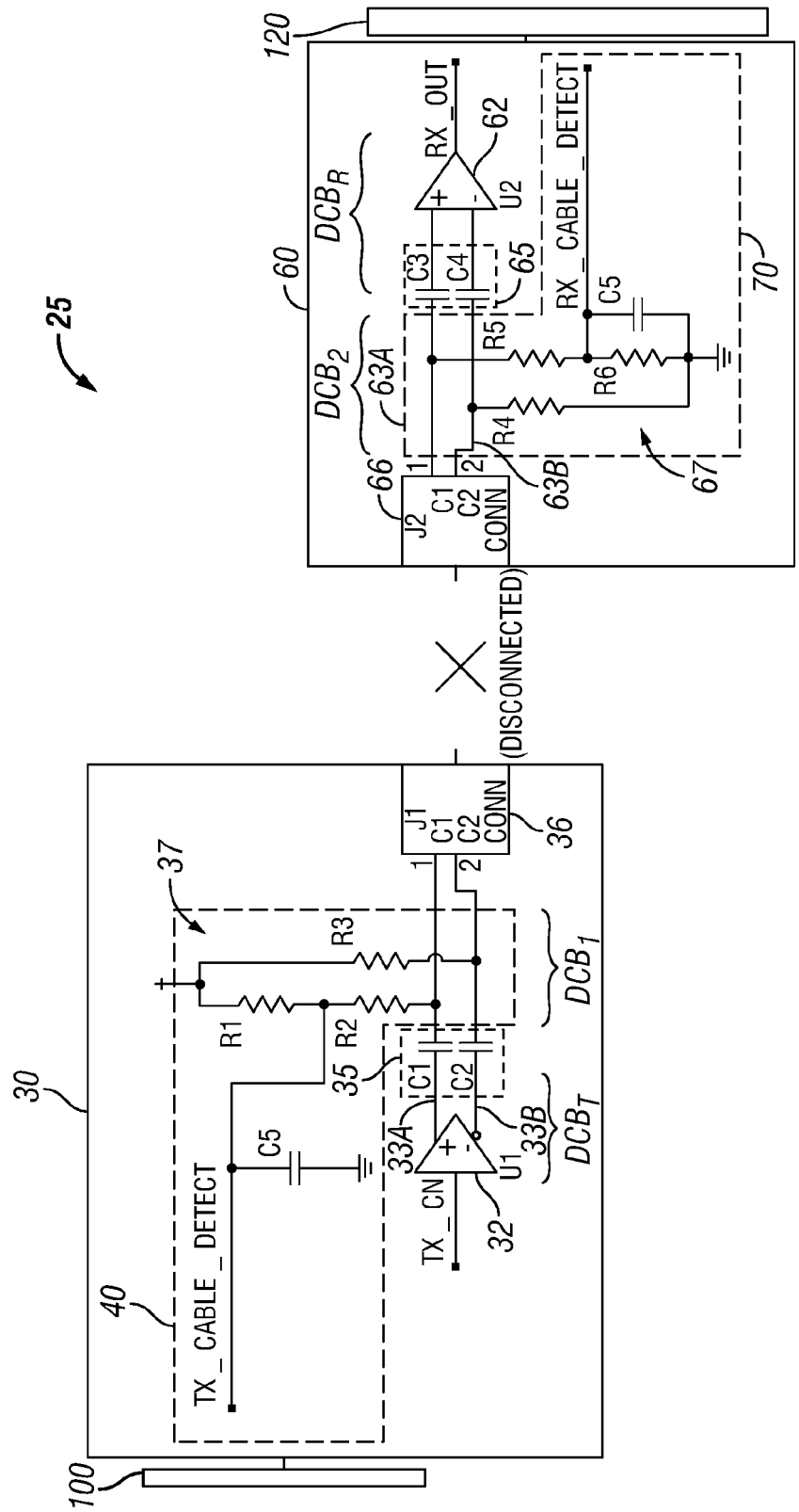
FIG. 1A is a schematic diagram of exemplary connector circuitry for connecting two electronic devices, shown prior to making a connection between the two electronic devices.

FIG. 1A is a schematic diagram of exemplary connector circuitry 25 for connecting two electronic devices 100, 120, shown prior to making the connection. Each of the devices 100, 120 may be a component or subsystem of a computer system, for example. The connector circuitry 25 includes a first connector circuit 30, referred to in this embodiment as the "transmitter" circuit 30, which may be provided with the first device 100, and a second connector circuit 60, referred to in this embodiment as a "receiver" circuit 60, that may be provided with the second device 120. The transmitter circuit 30 includes a differential amplifier 32 coupled to the connector junction 36 along parallel, differential signal paths 33A, 33B. The differential signal paths 33A, 33B are capacitively coupled using respective parallel capacitors C1, C2 in a capacitor section 35. Similarly, the receiver circuit 60 includes a differential amplifier 62 coupled to the connector junction 66 along parallel, differential signal paths 63A, 63B. The differential signal paths 63A, 63B are capacitively coupled using respective parallel capacitors C3, C4 in a capacitor section 65. The capacitive coupling (also known as "AC coupling") of the differential signal flow paths 33A, 33B, and 63A, 63B using the capacitor sections 35, 65 allows the transmission of AC (alternating-current) signals across the capacitors C1, C2 and across the capacitors C3, C3. DC (direct current) cannot flow across the capacitor sections 35, 65 because DC sees the capacitors C1, C2 and C3, C4 as an open circuit.

The first device 100 presents a transmitter input signal "TX-IN" to the differential amplifier 32 at the transmitter circuit 30. The TX-IN signal is a single-ended signal that is measured as a voltage level between the signal and ground. Using a process referred to as differential signaling, the differential amplifier 32 electrically transmits a representation of the signal TX-IN on the differential signal paths 33A, 33B. Specifically, the differential amplifier 32 converts the single-ended TX-IN signal into a differential signal that is a voltage level measured between the + and − nodes of the differential amplifier 32. For example, the TX-IN signal could use 3.3V to represent a high level and 0V to represent a low level. The differential signal generated by the differential amplifier 32 would use the difference between the + and − to represent high and low logic levels. The average between the two is the DC offset. For example, the differential amplifier 32 could use a 3V level on + and a 1V level on − to represent a high-level, and 1V on + and 3V on − to represent a low level, in which case there would be a transmitter-side DC bias "$DCB_T$" having a magnitude of 2V in the differential signal generated by the differential amplifier 32. The transmitter-side DC bias $DCB_T$ is in the region of the transmitter circuit 30 to the left of the pair of capacitors C1, C2. While the AC signal generated by the differential amplifier 32 can easily pass through the capacitors C1, C2, the transmitter-side DC bias $DCB_T$ cannot pass through the capacitor section 35 since any DC sees the capacitors C1, C2 as an open circuit. Similarly, the receiver-side differential amplifier 66 imparts a receiver-side DC bias "$DCB_R$" to the receiver circuit 60 that cannot pass through the capacitor section 65.

Due to the inability of DC current to pass through the capacitors C1, C2 and C3, C4, there would ordinarily not be a defined DC bias in the region immediately opposite the capacitor section 35 from the differential amplifier 32 nor immediately opposite the capacitor section 65 from the differential amplifier 62 (i.e. between the capacitor section 35 and the capacitor section 65). However, a transmitter-side DC biasing circuit 40 imparts a DC bias of magnitude "$DCB_1$" to the region immediately opposite the capacitor section 35 from the differential amplifier 32 (i.e. to the right of the capacitor section 35 in FIG. 1) when the transmitter circuit 30 is not connected to the receiver circuit 60. Likewise, a receiver-side DC biasing circuit 70 is added to the receiver circuit 60 to impart a DC bias of magnitude "$DCB_2$" to the region immediately opposite the capacitor section 65 from the differential amplifier 62 (i.e. to the left of the capacitor section 65 in FIG. 1) when the receiver circuit 60 is not connected to the transmitter circuit 30. The transmitter-side DC biasing circuit 40 includes a resistor section 37 with resistors R1, R2, and R3 configured as shown. The receiver-side DC biasing circuit 70 includes a resistor section 67 with resistors R4, R5, R6. The resistance values of resistors R1, R2, R3 included with the resistor section 37 and the resistance values of resistors R4, R5, R6 included with the resistor section 67 are selected so that the magnitude of $DCB_1$ and $DCB_2$ are unequal when the transmitter circuit 30 and receiver circuit 60 are not connected.

Figure 1B:
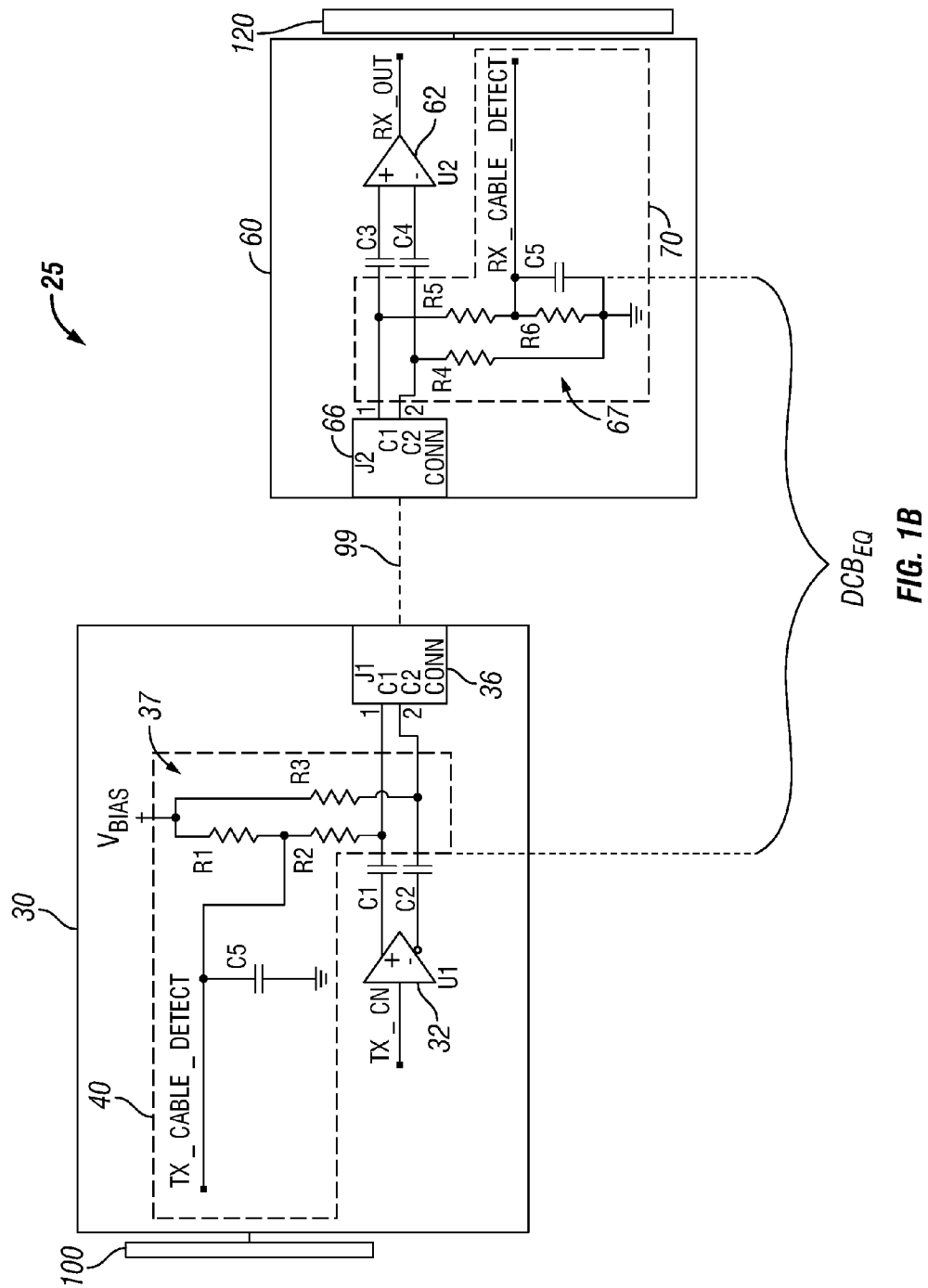
FIG. 1B is a schematic diagram of the connector circuitry after establishing the connection between the two electronic devices.

FIG. 1B is a schematic diagram of the connector circuitry 25 after establishing a connection 99 between the two electronic devices 100, 120 at connector junctions 36, 66, such as by coupling a connector of the first device 100 with a corresponding connector of the second device 120. The connection 99 may be a card-card connection or a cable connection, for example. The differential signal generated by the differential amplifier 32 travels along the complementary signal paths 33A, 33B, across the connection 99, to the receiver circuit 60, where it travels across the corresponding differential signal flow paths 63A, 63B to the differential amplifier 62. The differential amplifier 62 outputs a signal "RX-OUT" representative of the original signal TX-IN to the second device 120.

The connector circuitry 25 may similarly be used to send signals the reverse direction. The device 120 may present a single-ended input signal to the differential amplifier 62, the differential amplifier 62 may transmit a differential signal representative of that single-ended input signal to the differential amplifier 32, and the differential amplifier 32 may output a single-ended output signal representative of the original single-ended input signal. This process is not separately diagrammed because it substantially mirrors the process described herein of transmitting the input signal from the device 100 to the device 120.

When the transmitter circuit 30 and receiver circuit 60 are connected, the resistor sections 37, 67 collectively form a resistive divider network, causing the magnitude of the DC biases between the capacitor section 35 and the capacitor section 65 to equilibrate to an intermediate value "$DCB_{EQ}$." The AC signal transmitted across the connection 99 is unaffected by the DC bias $DCB_{EQ}$ between the capacitor sections 35, 65, again, because DC sees capacitors as an open circuit. Thus, the differential signal travels across the connection 99 despite the DC bias imposed between the capacitor sections 35, 65. Any effects of the DC bias circuits 30, 60 on the AC differential signal is minimized by selecting large enough resistor values in the resistor sections 37, 67 and minimizing stub lengths. When the transmitter circuit 30 and receiver circuit 60 are subsequently disconnected, the DC bias in this region will return to separate values $DCB_1$ and $DCB_2$. This change in DC bias may therefore be detected on either or both of the transmitter circuit 30 and the receiver circuit 60 as an indication that the connection 99 has been established or broken. For example, the portion of the transmitter-side DC bias circuit 40 designated "TX Cable Detect" monitors the DC bias on the transmitter circuit 30 to the right of capacitors C1, C2 and signals any detected change in value as an indication of whether the transmitter circuit 30 has been connected to or disconnected from the receiver circuit 60. Similarly, the portion of the receiver-side DC bias circuit 70 labeled "RX Cable Detect" also optionally monitors the DC bias to the left of the capacitors C3, C4 at the receiver circuit 60 and signals any detected change in the DC bias at the receiver circuit 60 as an indication of whether the receiver circuit 60 has been connected to or disconnected from the receiver circuit 60. Any effect of the AC differential signal on the DC bias measurement is reduced by the large resistance values in the resistor sections 37, 67 and by optionally adding capacitors C5, C6 to the measured lines. A connection status signal may be generated to signal whether the transmitter circuit 30 and receiver circuit 60 are currently connected or disconnected. The connection status signal may trigger a visual indication of the connection or disconnection, such as by illuminating or de-illuminating an LED or lamp, or by displaying a connection status message on a display console.

The connection 99 may be reliably detected by detecting a change in DC bias at either the transmitter circuit 30 to the right of capacitors C1, C2 or at the receiver circuit 60 to the left of capacitors C3, C4. However, this change in DC bias at both DC bias circuits 40, 70 may be desirable in some applications. For example, detecting the change in DC bias at both DC biasing circuits 40, 70 provides a redundant check of whether the connection 99 has been established. Detecting a change in DC bias at both DC biasing circuits 40, 70 may also be useful for generating a local connection status signal at each device 100, 120. The DC bias circuit 40 may generate a local connection status signal for use by the device 100, and the DC bias circuit 70 may generate a local connection status signal or use by the device 120. For example, if the device 100 is a peripheral hardware device and the device 120 is a motherboard of a computer system, then the connection status signal generated at the peripheral hardware device may be used to trigger a startup process on the hardware device, while the connection status signal generated at the motherboard may be used by the operating system to take control of the hardware device.

The connection 99 may also be confirmed by comparing the DC bias measured by TX Cable Detect to the DC bias measured at RX Cable Detect. For example, determining that these DC bias values are equal confirms that the transmitter circuit 30 and receiver circuit 60 are connected, and determining these DC bias values are unequal indicates the connection 99 is not present. These DC bias values may also be compared to the expected intermediate value $DCB_{EQ}$.

Figure 2:
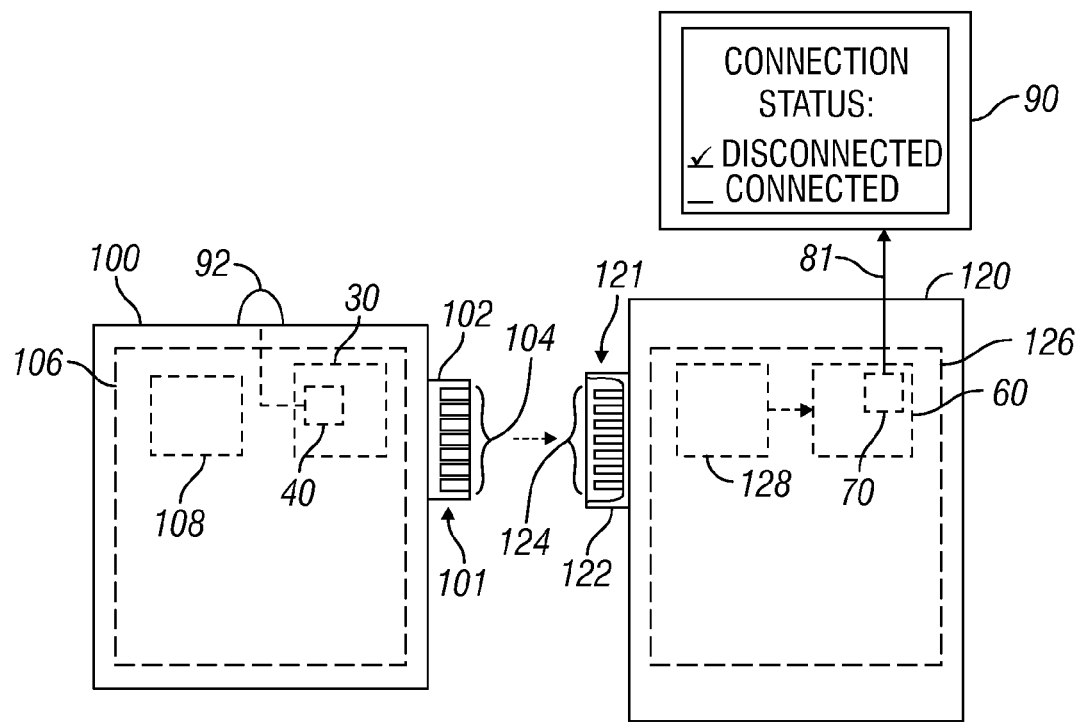
FIG. 2 is a schematic diagrams of the first device positioned next to the second device prior to connecting the two devices.
Figure 2A:
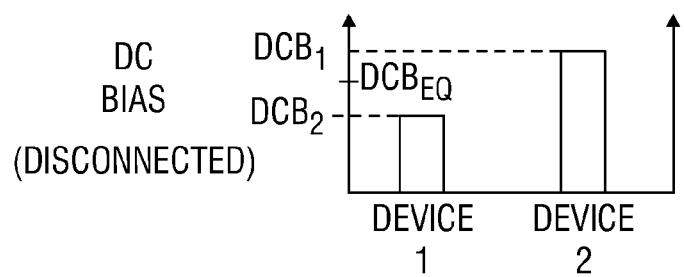
FIG. 2A is a graph depicting the DC bias values of the first device and second device when not connected.
Figure 3:
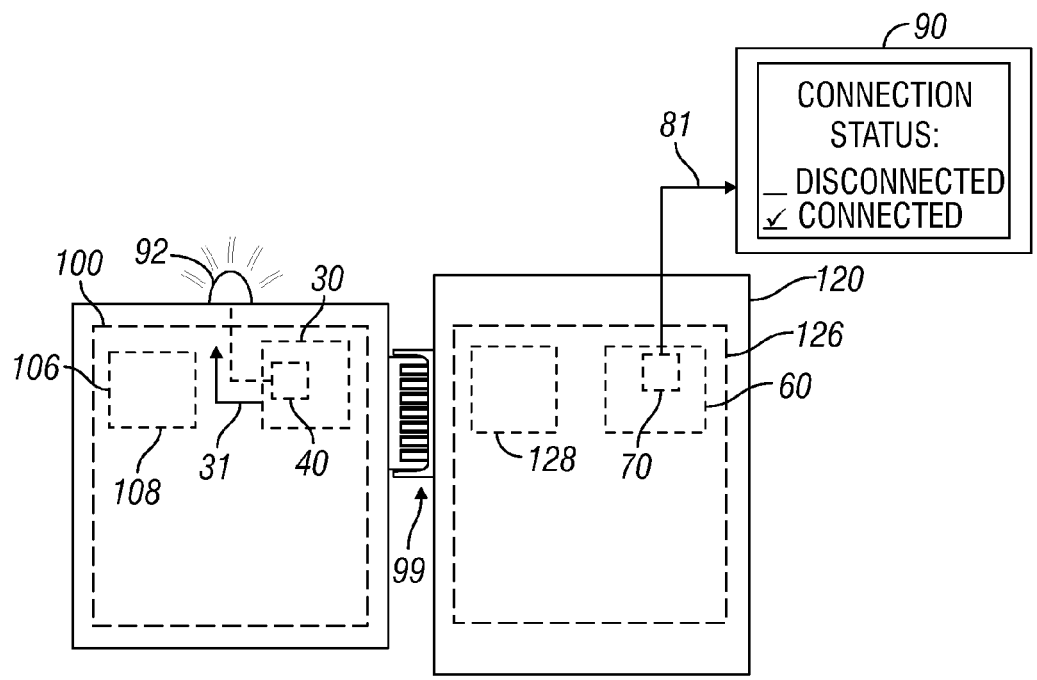
FIG. 3 is a schematic diagram of the male connector body of the first device coupled to the female connector body of the second device.

FIGS. 2 and 3 are schematic diagrams illustrating a system embodiment incorporating the connector circuitry 25 in a sequence of connecting the two devices 100, 120. FIG. 2 shows the first device 100 positioned next to the second device 120 prior to connecting the two devices 100, 120. FIG. 2A (inset) is a graph depicting these unequal DC bias values $DCB_1$, $DCB_2$ of the first device 100 ("device 1") and second device 120 ("device 2") when not connected. The first device 100 has a connector 101 with a male connector body 102 and a plurality of connector terminals 104. The second device 120 has a connector 121 with a female connector body 122 and a plurality of connector terminals 124. The male connector body 102 is configured to mate directly with the female connector body 122 in the direction of the arrow, to place the connector terminals 104 in contact with corresponding connector terminals 124. Alternatively, a cable (not shown) may be used to couple the connector 101 with the connector 121. The transmitter circuit 30 resides on a circuit board 106 coupled to the connector 101 of the first device 100. The receiver circuit 60 resides on a circuit board 126 coupled to the connector 121 of the second device 120. Software 108 is installed in memory on the circuit board 106, and software 128 is installed in memory on the circuit board 126. The devices 100, 120 are generically drawn to reflect that a variety of electronic devices may be configured for connection in the manner described.

An optional LED 92 on the first device 100 is in electronic communication with the DC bias circuit 40 of the transmitter circuit 30. The LED 92 provides a visual indication of whether or not the devices 100, 120 are connected. Here, the LED 92 is configured to illuminate in response to the connection status signal from the DC bias circuit 40. An optional display 90 is in electronic communication with the DC bias circuit 70 of the transmitter circuit 60. The display 90 also provides a visual indication of whether or not the devices 100, 120 are connected. Here, the display 90 is configured to show the connection status as either "connected" or "not connected." As verification, the software 108, 128 or other circuitry may compare the detected values of DC bias to the expected value $DCB_{EQ}$ whenever a change in magnitude of the DC bias is detected. Because the devices 100, 120 are not connected in FIG. 2, the magnitude of the DC bias imparted by the transmitter circuit 30 remains $DCB_1$ and the magnitude of the DC bias imparted by the receiver circuit 60 remains $DCB_2$. Therefore, the LED 92 is not illuminated and the display 90 indicates the connection status as "not connected."

Figure 3A:
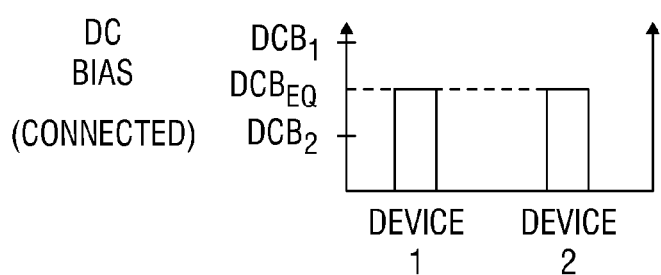
FIG. 3A is a graph depicting that the DC bias on the transmitter circuit and receiver circuit have equilibrated in response to being connected.

FIG. 3 shows the two devices 100, 120 connected by physically coupling the male connector body 102 of the first device 100 with the female connector body 122 of the second device 120, to place the terminals 104 in contact with the corresponding terminals 124 (see FIG. 2 for reference to the terminals 104, 124, individually). The contacting terminals 104, 124 provide electrical pathways to convey signals between the devices 100, 120, thereby allowing the devices 100, 120 to communicate electronically over the established connection 99. The first device 100 may now send signals, via the transmitter circuit 30, across the connection 99 to the receiver circuit 60 of the second device 120, in the manner described with reference to FIGS. 1A, 1B. FIG. 3A (inset) is a graph depicting that the DC bias between the transmitter circuit 30 and receiver circuit 60 has equilibrated to the value $DCB_{EQ}$ in response to being connected. The DC bias circuit 40 of the transmitter circuit 30 outputs a connection status signal 31 in response to detecting the change in the DC bias value at the transmitter circuit 30 that results from the connection 99. The LED 92 illuminates in response to receiving the connection status signal 31. The DC bias circuit 70 of the receiver circuit 60 outputs a connection status signal 81 in response to detecting the change in the DC bias vale at the receiver circuit 60. The display 90 updates the connection status to "connected" in response to receiving the connection status signal 81.

Figure 4:
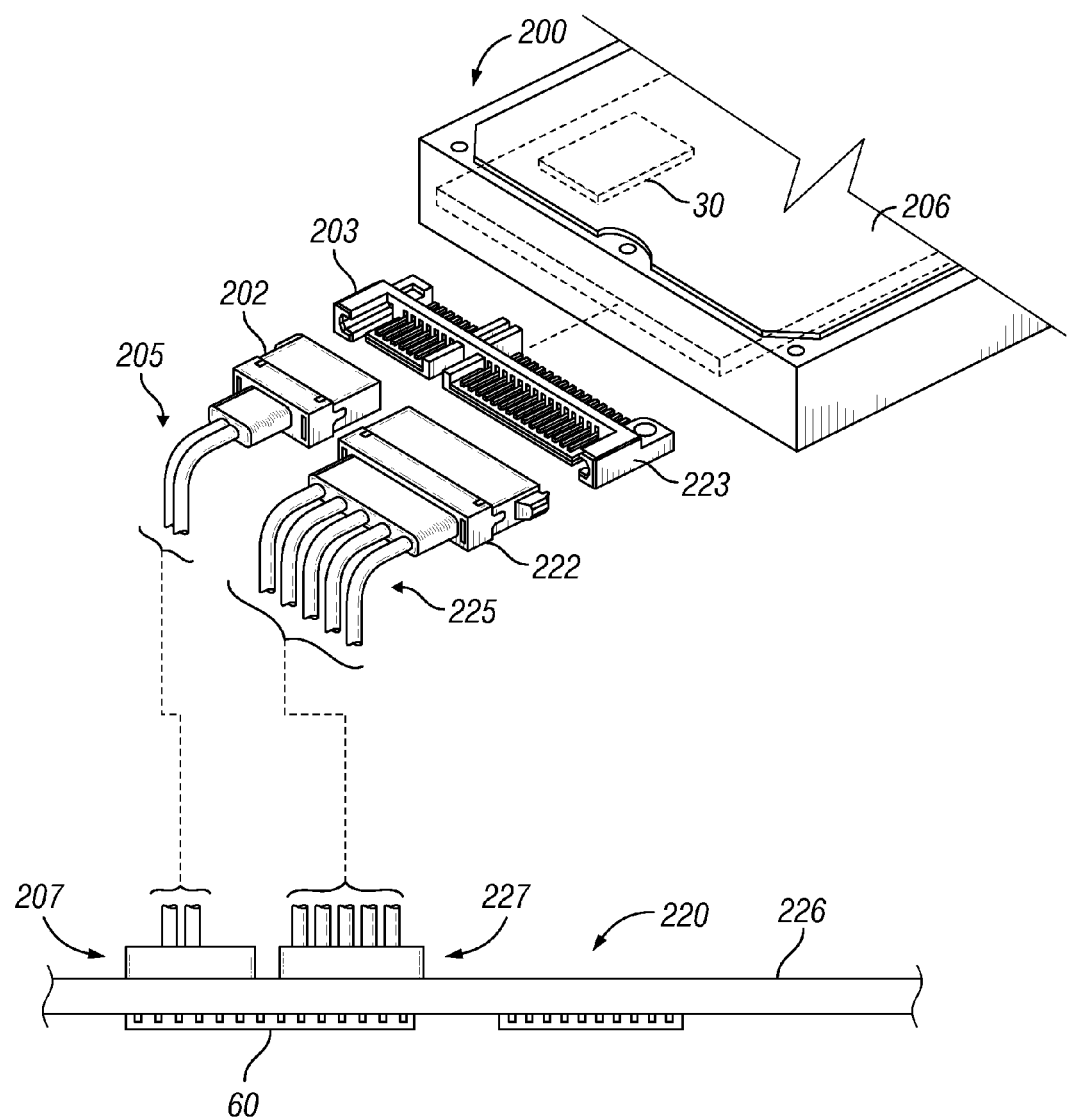
FIG. 4 is a diagram of an embodiment of the invention wherein a SATA-type connection is modified to include the connector circuitry of FIG. 1A for connecting a hard drive to a motherboard of a computer system.

Examples of existing connector designs that incorporate capacitive coupling include SATA (Serial Advanced Technology Attachment), SAS (Serial Attached SCSI), and variants thereof. These existing connector designs are candidates for redesign according to one or more other embodiments of the invention. Illustrating with an example, FIG. 4 provides a diagram of an embodiment of the invention wherein a SATA type connection is modified to include the connector circuitry of FIG. 1A for connecting a hard drive 200 to a motherboard 226 of a computer system 220. The transmitter circuit 30 (see FIG. 1) is provided on the main circuit board 206 of the hard drive 200. The receiver circuit 60 is provided on the motherboard 226. The hard drive 200 is electrically connected to the motherboard 226 using mating (male/female) SATA-type interface connectors 202, 203 and mating (male/female)

SATA-type power connectors 222, 223. The female SATA connectors 203, 223 are provided on the hard drive 200. The male SATA connectors are connected to the motherboard 226 using wire sets 202, 222 extending from terminals of the male SATA connectors 202, 222 to connectors 207, 227 at the motherboard 226. This cable-type connection allows flexibility in positioning and connecting the hard drive 200 to the motherboard 226. The hard drive may be mounted to a system chassis (not shown) for support.

Figure 5:
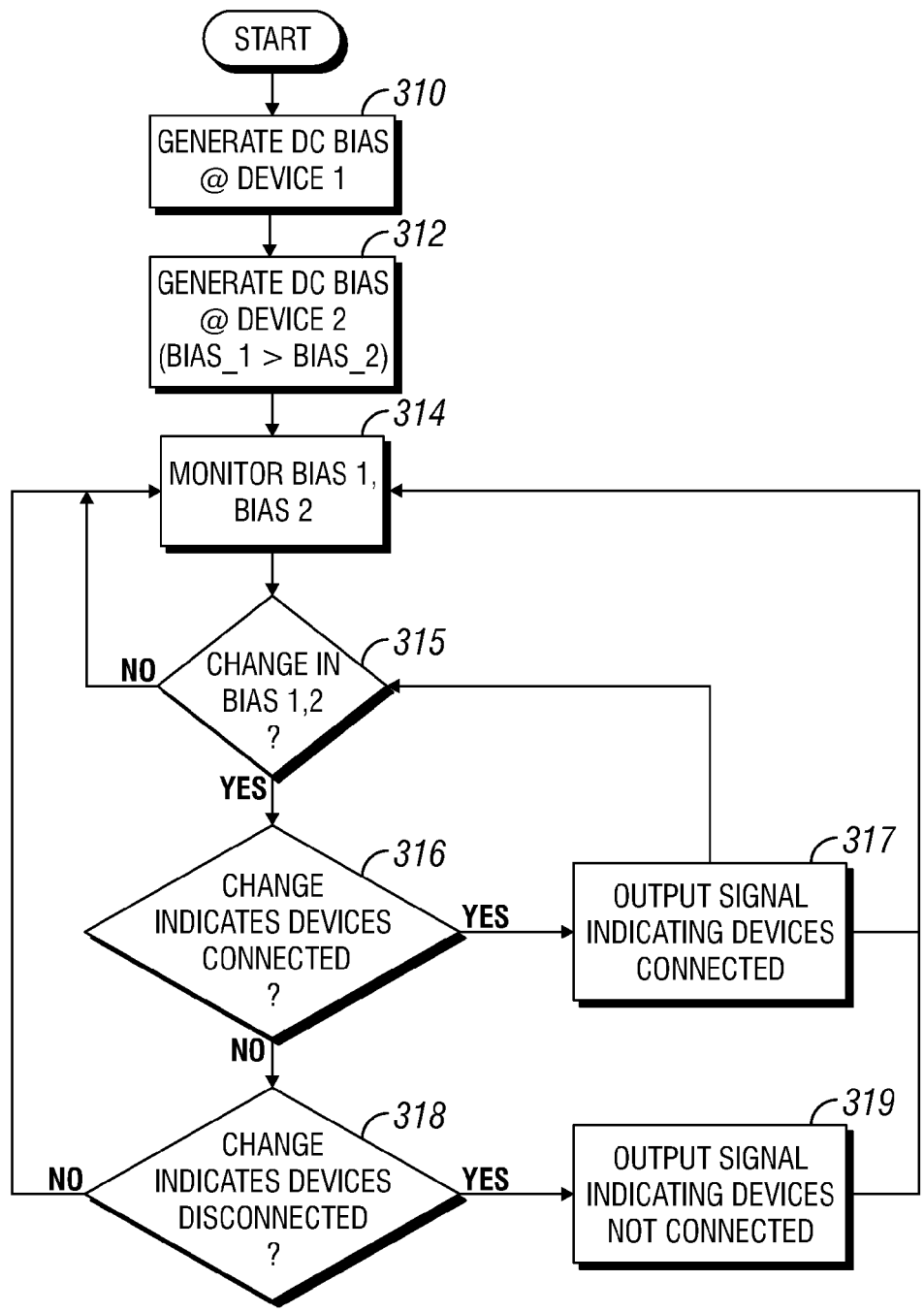
FIG. 5 is a flowchart outlining a method of detecting the connection of two electronic connectors

FIG. 5 is a flowchart summarizing a method for connecting first and second electronic devices ("Device 1" and "Device 2") according to another embodiment of the invention. A first DC bias ("Bias 1") is generated at the first device in step 310. A second DC bias ("Bias 2") is generated at the second device in step 311, such that Bias 2 is greater than Bias 1 when the connectors are not connected. A connection may be selectively established between the two devices, such as by connecting a connector of the first device to a connector of the second device. When the two connectors are connected, Bias 1 and Bias 2 will typically equalize to some intermediate value. When the two connectors are subsequently disconnected, Bias 1 and Bias 2 will return to their initial values. Thus, the DC bias of one or both devices is monitored according to step 314, and any change in magnitude of the DC bias of either connector is detected in step 315 as an indication that the two devices may have been either connected or disconnected.

According to conditional step 316, if a changed DC bias value indicates that the two devices are connected, then a signal is output in step 317 indicating that the two devices are connected. For example, the values of Bias 1 and Bias 2 may be compared to values that are expected to result when the two devices are connected. The values of Bias 1 and Bias 2 may also be compared to each other to determine if they are substantially equal, as would be expected when the two devices are connected. Alternatively, according to conditional step 318, if the changed DC bias values are indicate that the two devices are disconnected, then a signal is output in step 319 indicating that the two devices are not connected. The signals output in either step 317 or 319 may be used to trigger certain electronic processes or results. For example, the signal output in step 317 may cause a lamp to illuminate as a visual confirmation of the connection to the user. Alternatively, the signal output in step 319 may cause the lamp to turn off as a visual confirmation of the devices being disconnected. A message may be displayed too, indicating whether the two devices are connected. If the signal in step 317 is generated, the displayed message may indicate that the two devices are connected. If the signal in step 319 is instead generated, the displayed message may indicate that the two devices are disconnected. Still further, the signal output may be an electronic communication with a processor or controller to indicate the availability of the connection.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An apparatus, comprising:
a first connector circuit having a first differential amplifier, a first differential signal path, a first capacitor section including a first pair of parallel capacitors capacitively coupling the first differential amplifier to the first differential signal path, and a first DC biasing circuit for imparting a first DC bias to the first differential signal path opposite the first capacitor section;
a second connector circuit having a second differential amplifier, a second differential signal path, a second capacitor section including a second pair of parallel capacitors capacitively coupling the second differential amplifier to the second differential signal path, and a second DC biasing circuit for imparting a second DC bias to the second differential signal path opposite the second capacitor section having a different magnitude than the first DC bias when the first and second connector are not connected, the second connector circuit configured for removably connecting to the first connector circuit with the second differential signal path in communication with the first differential signal path; and
wherein one or both of the first and second connector circuits is configured for detecting a change in the first or second DC bias and outputting a connection status signal in response to the detected change.

2. The apparatus of claim 1, further comprising:
the first differential amplifier is configured for transmitting a differential representation of a single-ended input signal along the first pair of differential signal paths to the second pair of differential signal paths; and
the second differential amplifier is configured for converting the differential representation of the single-ended input signal to a single-ended output signal representative of the single-ended input signal.

3. The apparatus of claim 1, further comprising first and second resistor sections included with the first and second DC biasing circuits forming a resistive divider network in response to connection of the first and second connector circuits.

4. The apparatus of claim 1, wherein the connection status signal indicates a connection has been established only if the first and second DC bias are equal.

5. The apparatus of claim 4, wherein the first and second connector bodies are configured to mate such that the terminals of the first connector body contact corresponding terminals of the second connector body.

6. The apparatus of claim 1, further comprising:
a first connector body having a plurality of electrical terminals in communication with the first differential signal path; and
a second connector body having a plurality of electrical terminals in communication with the second differential signal path.

7. A system, comprising:
a first electronic device configured for generating a single-ended data signal and having a first connector with a first connector circuit configured for generating a differential signal representative of the single-ended data signal using a first differential signal path capacitively coupled to the first electronic device by a pair of parallel capacitors;
a second electronic device having a second connector configured for connecting to the first connector, the second connector including a second connector circuit configured for receiving and interpreting the differential signal using a second differential signal path capacitivley coupled by another pair of parallel capacitors to the second electronic device;
a DC biasing circuit for imparting a first DC bias to the first connector circuit and a second DC bias to the second connector circuit, wherein the first and second DC biases have different magnitudes when the first and second connectors are not connected, and for detecting a change in the first or second DC biases and outputting a connection status signal in response thereto.

8. The system of claim 7, wherein the second connector circuit is configured for converting the differential signal representative of the single-ended data signal back to a single-ended data signal.

9. The system of claim 7, further comprising:
a first differential amplifier coupled to the first differential signal path for generating and transmitting the differential signal along the first differential signal path to the second pair of differential signal paths; and
a second differential amplifier coupled to the second differential signal path and configured for generating a single-ended output signal representative of the differential signal.

10. The system of claim 7, wherein the DC biasing circuit is configured to generate the connection status signal indicating a connection between the first and second connector circuits if the first and second DC bias are substantially equal.

11. The system of claim 7, further comprising:
a first connector body having a plurality of electrical terminals in communication with the first differential signal path; and
a second connector body having a plurality of electrical terminals in communication with the second differential signal path.

12. The system of claim 11, wherein the first and second connector bodies are configured to mate such that the terminals of the first connector body contact the corresponding terminals of the second connector body.

13. The system of claim 7, wherein the first electronic device comprises a motherboard of a computer system and the second electronic device comprises a hardware device for electronically connecting to the motherboard.

14. A method, comprising:
generating a single-ended data signal at a first electronic device and generating a differential signal representative of the single-ended data signal on a first differential signal path capacitively coupled to the first electronic device by a pair of parallel capacitors;
receiving and interpreting the differential signal at a second electronic device using a second differential signal path capacitivley coupled to the second electronic device by another pair of parallel capacitors;
generating a first DC bias at the first electronic device;
generating a second DC bias at the second electronic device having a different magnitude than the first DC bias when the first and second devices are not connected;
detecting a change in magnitude of the first or second DC bias in response to connection of the first and second electronic devices; and
generating a connection status signal indicating whether the first and second electronic devices are connected according to the change in or magnitude of the first or second DC bias.

15. The method of claim 14, further comprising transmitting a data signal across the connection from the first device to the second device when the connection status signal indicates the first and second electronic devices are connected.

16. The method of claim 14, further comprising:
outputting a visual indication of whether the first and second electronic devices are connected or disconnected in response to the connection status signal.

* * * * *